US008855664B2

(12) United States Patent
Gao et al.

(10) Patent No.: US 8,855,664 B2
(45) Date of Patent: Oct. 7, 2014

(54) METHOD FOR ACQUIRING INFORMATION OF HOME NODE B, METHOD FOR BALANCING LOAD, AND APPARATUSES THEREFOR

(75) Inventors: Yin Gao, Shenzhen (CN); Zhongming Chen, Shenzhen (CN); Jin Xi, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/634,571

(22) PCT Filed: Sep. 2, 2010

(86) PCT No.: PCT/CN2010/076582
§ 371 (c)(1),
(2), (4) Date: Sep. 13, 2012

(87) PCT Pub. No.: WO2012/027899
PCT Pub. Date: Mar. 8, 2012

(65) Prior Publication Data
US 2013/0183980 A1     Jul. 18, 2013

(51) Int. Cl.
*H04W 72/00*     (2009.01)
*H04W 36/22*     (2009.01)
*H04W 36/30*     (2009.01)
*H04W 36/00*     (2009.01)

(52) U.S. Cl.
CPC .......... *H04W 36/30* (2013.01); *H04W 36/0061* (2013.01); *H04W 36/22* (2013.01); *H04W 36/0072* (2013.01); *H04W 36/0077* (2013.01)
USPC ........... 455/453; 455/444; 455/439; 370/331; 370/338

(58) Field of Classification Search
CPC ......... H04W 28/08; H04W 36/22; H04Q 7/20
USPC ................... 370/329, 331–338; 455/436–453
See application file for complete search history.

(56) References Cited

U.S. PATENT DOCUMENTS 7,899,011 B2 *   3/2011   Petrovic et al. ............... 370/329
8,060,095 B1 *   11/2011  Gerami ........................ 455/437
(Continued)

FOREIGN PATENT DOCUMENTS

CN      101651961 A     2/2010
CN      101754322 A     6/2010
(Continued)

OTHER PUBLICATIONS

International Search Report for PCT/CN2010/076582 dated May 23, 2011.

*Primary Examiner* — Sharad Rampuria
(74) *Attorney, Agent, or Firm* — Stephen Yang; Ling Wu; Ling and Yang Intellectual Property LLC

(57) ABSTRACT

The present invention discloses a method for acquiring information of a home NodeB, a method for balancing load, and implementation apparatuses thereof, which are used to solve the problem how to guide a UE to move to an appropriate home NodeB when a macro cell performs load balancing. In the present invention, information of a target NodeB is acquired actively through a macro NodeB, and according to an access type of the target NodeB, subscribers of the macro NodeB are timely balanced to the home NodeB which can provide services, thereby reducing a call drop rate resulted from blind handover. Since measurement information of the UE is fully considered, success rate of balancing handover is enhanced, and the object of performing effective load balancing in a home NodeB environment is achieved.

12 Claims, 3 Drawing Sheets

(56) References Cited

U.S. PATENT DOCUMENTS

| | | | |
|---|---|---|---|
| 8,446,869 B2* | 5/2013 | Lee et al. | 370/329 |
| 8,477,724 B2* | 7/2013 | Bakker et al. | 370/331 |
| 8,494,543 B2* | 7/2013 | Koodli et al. | 455/453 |
| 8,504,055 B2* | 8/2013 | Vikberg et al. | 455/453 |
| 8,509,780 B2* | 8/2013 | Sridhar et al. | 455/436 |
| 8,532,660 B2* | 9/2013 | Zou et al. | 455/436 |
| 8,594,672 B2* | 11/2013 | Agrawal et al. | 455/436 |
| 8,600,384 B1* | 12/2013 | Moreno et al. | 455/436 |
| 8,644,841 B1* | 2/2014 | Oroskar et al. | 455/453 |
| 8,688,123 B2* | 4/2014 | Gao et al. | 455/436 |
| 8,737,998 B2* | 5/2014 | Siomina et al. | 455/436 |
| 2004/0185876 A1* | 9/2004 | Groenendaal et al. | 455/456.5 |
| 2010/0130210 A1 | 5/2010 | Tokgoz et al. | |
| 2010/0210268 A1* | 8/2010 | Lim et al. | 455/436 |
| 2010/0297955 A1* | 11/2010 | Marinier et al. | 455/73 |
| 2011/0165902 A1* | 7/2011 | Demarez et al. | 455/507 |

FOREIGN PATENT DOCUMENTS

| | | |
|---|---|---|
| CN | 101765153 A | 6/2010 |
| CN | 101772099 A | 7/2010 |
| CN | 101801049 A | 8/2010 |

\* cited by examiner

METHOD FOR ACQUIRING INFORMATION OF HOME NODE B, METHOD FOR BALANCING LOAD, AND APPARATUSES THEREFOR

TECHNICAL FIELD

The present invention relates to a radio cellular communication system, and more particularly, to a method for acquiring information of a home NodeB, a method for implementing load balancing in home NodeB environment, and corresponding implementation apparatuses thereof in a Long Term Evolution (LTE) mobile communication system.

BACKGROUND OF THE RELATED ART

In 36300-800, a Long Term Evolution (LTE) network consists of an Evolved UMTS Terrestrial Radio Access Network (EUTRAN) Evolved NodeB (eNB) and an Evolved Packet Core (EPC), and the network is flattening. Wherein, an EUTRAN includes a set of eNBs connected with the EPC through an S1 interface, eNBs can be connected with each other through an X2. The S1 and X2 are logical interfaces. One EPC can manage one or more eNBs, one eNB also can be controlled by multiple EPCs, and one eNB can manage one or more cells. One or a plurality of cells belong to one Tracking Area (TA). Meanwhile, a home NodeB also exists in the LTE network, in order to satisfy the demand of coverage in public places, the combination of cells in one or more home NodeBs are defined as a Closed Subscriber Group (CSG), which is used to perform group management on subscribers. A premise of a subscriber belonging to a certain CSG is an International Mobile Subscriber Identification Number (IMSI) of a terminal device of the subscriber signing with the CSG. With the introduction of CSG concept, the home NodeB introduces a concept with respect to a CSG access mode. Wherein, an access mode of the home NodeB has three kinds, which are Open access mode, Close access mode and Hybrid access mode respectively. Wherein, the home NodeB of which the access mode is Open allows subscribers and non-subscribers to access and is identical with a normal macro cell; the home NodeB of which the access mode is Close only allows the subscribers signing with the CSG to access; and with regard to the home NodeB of which the access mode is Hybrid, though the subscribers and non-subscribers are allowed to access simultaneously, resource usage for the subscribers are superior to the non-subscribers, and in the condition of scant resources, the home Nodeb provides priority services for the subscribers and may switch the non-subscribers to other cells or release signaling connection of the non-subscribers. A network side can distinguish whether the home NodeB is the Close home NodeB or Hybrid home NodeB according to a Physical Cell Identifier (PCI). Wherein, judging an identity by which a User Equipment (UE) accesses the network can be completed according to an Allowed CSG List of the UE. The Allowed CSG List is an information list of all CSGs signed with the UE, and is stored at the network side and UE respectively. If the CSG to which the home NodeB accessed by the UE belongs is in the Allowed CSG List of the UE, the UE enters as a CSG subscriber, otherwise the accessing the UE enters as a CSG non-subscriber.

In the network deployment, as the deployment of home NodeBs in the network is relatively free and the number of home NodeBs is large, the NodeB can be used to implement coverage capacity enhancement of a macro NodeB, a difference exists between network structures of the home NodeB and macro NodeB, the home NodeB can be directly connected with a Mobility Management Entity (MME) of core network and also can be connected with a home NodeB gateway, and a ground interface is the S1 interface as shown in FIG. 1.

If operators deploy the home NodeB to be used for expanding the network capacity, when load of the macro cell exceeds a certain threshold, the subscribers can be balanced to the home NodeB, and generally, both the home NodeB in Open mode and home NodeB in Hybrid mode can accept the non-subscribers.

However, since the coverage scope of the home NodeB is relatively small, a cell type is defined according to a cell coverage scope in the existing protocol, and is vaguely defined as levels of very small, small, medium and large etc. Meanwhile, geographic location information of the home NodeB has a certain effect on correctly judging the coverage scope of the home NodeB, and the geographic location information can include information such as longitude, latitude and elevation and so on of the home NodeB here. When the network side determines to move the UE to the home NodeB, if signal quality of the home NodeB is not considered, it is most likely to cause a handover failure to the subscribers and increase a call drop rate.

SUMMARY OF THE INVENTION

In view of this, the present invention provides a method for acquiring information of a home NodeB, a method for balancing load, and implementation apparatuses thereof, which are used to solve the problem how to guide a UE to move to an appropriate home NodeB when a macro cell performs load balancing.

In order to achieve the objects of the present invention, the following technical scheme is adopted in the present invention.

A method for implementing load balancing in a home NodeB environment, comprising:

a macro NodeB sending a home NodeB information request message to a target home NodeB so as to acquire information of the target home NodeB;

when load of a macro cell exceeds a preset threshold, according to the obtained information of the target home NodeB and a measurement report reported by a User Equipment (UE), the macro NodeB selecting the target home NodeB with relatively better signal quality for the UE to perform handover.

Furthermore, the step of the macro NodeB acquiring the information of the target home NodeB is specifically:

the macro NodeB sending the home NodeB information request message to the target home NodeB;

the target home NodeB feeding back a home NodeB information request response message to the macro NodeB after receiving the home NodeB information request message;

besides a global identifier of a target NodeB and TAI information, information of the target NodeB in the home NodeB information request response message comprises one or more items in the following information: a cell type of a target NodeB cell, an EUTRAN Cell Global Identifier (ECGI), Closed Subscriber Group Identifier (CSG ID) information, an access attribute of the home NodeB and geographic location information of the home NodeB; and the type of the target NodeB cell comprises: the macro cell and a home NodeB cell, or a type of cell coverage radius; the access attribute of the home NodeB comprises: an Open mode, a Close mode and a Hybrid mode.

Furthermore, the home NodeB information request message and home NodeB information request response message are implemented by expanding an existing S1 interface message or X2 interface message, or are implemented through a newly added S1 interface message or X2 interface message; if the home NodeB information request message and home NodeB information request response message are implemented through an S1 interface, the home NodeB information request message and home NodeB information request response message performs passthrough through a Mobility Management Entity (MME) or the MME and a home NodeB gateway.

Furthermore, before the macro NodeB acquires the information of the target home NodeB, further comprising:

the UE discovering a new home NodeB cell in the macro cell, and reporting a Physical Cell Identifier (PCI) of the newly discovered home NodeB cell to a current serving macro NodeB through an automatic neighboring cell discovery flow;

the macro NodeB guiding the UE to read a system broadcast of the newly discovered home NodeB cell, and acquiring the ECGI or the ECGI and CSG ID information of the newly discovered home NodeB cell.

After the macro NodeB acquires home NodeB information of the newly discovered home NodeB cell, further comprising:

the macro NodeB judging access attribute of the newly discovered home NodeB cell through the PCI, or judging the access attribute of the newly discovered home NodeB cell through the access attribute of the home NodeB carried in the home NodeB information request response message;

the macro NodeB executing a handover operation for the purpose of load balancing to the target home NodeB of which the access attribute is an Open mode or Hybrid mode.

Furthermore, with regard to the target home NodeB in the load balancing being the home NodeB in an inter-frequency Open mode or inter-frequency Hybrid mode, the macro NodeB sends a Radio Resource Control (RRC) reallocation message to the UE, deletes S-measure configuration information, makes the UE to be able to perform inter-frequency measurement, and according to the signal quality of the home NodeB cell in an intra-frequency measurement report reported by the UE in the macro cell, selects the UE of which a signal quality measurement result of the home NodeB cell is relatively higher to perform handover.

Based on the above method, the present invention also provides an apparatus for implementing load balancing in a home NodeB environment comprising:

a request module, used to: send a home NodeB information request message to a target home NodeB so as to acquire information of the target home NodeB;

a response module, used to: after receiving the home NodeB information request message, feed back a home NodeB information request response message to the request module; and a balancing module, used to: when load of a macro cell exceeds a preset threshold, according to the obtained information of the target home NodeB and a measurement report reported by a UE, select the target home NodeB with relatively better signal quality for the UE to perform handover.

Furthermore, besides a global identifier of a target NodeB and TAI information, information of the target NodeB in the home NodeB information request response message comprises one or more items in the following information: a cell type of a target NodeB cell, an ECGI, CSG ID information, an access attribute of the home NodeB and geographic location information of the home NodeB;

the type of the target NodeB cell comprises: the macro cell and a home NodeB cell, or a type of cell coverage radius; the access attribute of the home NodeB comprises: an Open mode, a Close mode and a Hybrid mode.

Furthermore, the home NodeB information request message and home NodeB information request response message are implemented by expanding an existing S1 interface message or X2 interface message, or are implemented through a newly added S1 interface message or X2 interface message; when the home NodeB information request message and home NodeB information request response message are implemented through an S1 interface, the apparatus further comprises a passthrough module located at an MME and/or a home NodeB gateway, used to pass through the home NodeB information request message and home NodeB information request response message between the request module and response module.

Furthermore, the apparatus further comprising:

a cell discovery module, used to: before acquiring the information of the target home NodeB, receive a PCI of a newly discovered cell reported by the UE, guide the UE to read a system broadcast of the newly discovered cell, and acquire an ECGI or the ECGI and CSG ID information of the newly discovered cell;

the balancing module judges an access attribute of the newly discovered cell according to the PCI or the information of the target home NodeB acquired by a home NodeB information acquisition module, and when the access attribute of the newly discovered cell is an Open mode or Hybrid mode, executes a handover operation for the purpose of load balancing.

Furthermore, with regard to the target home NodeB in the load balancing being a home NodeB in an inter-frequency Open mode or inter-frequency Hybrid mode, the balancing module sends an RRC reallocation message to the UE, deletes S-measure configuration information, makes the UE can perform inter-frequency measurement, and according to the signal quality of the home NodeB cell in an intra-frequency measurement report reported by the UE in the macro cell, selects the UE of which a signal quality measurement result of the home NodeB cell is relatively higher to perform handover.

The present invention also provides a method for a macro NodeB acquiring information of a home NodeB, comprising:

the macro NodeB sending a home NodeB information request message to a target home NodeB so as to acquire information of the target home NodeB.

Furthermore, in the method for a macro NodeB acquiring information of a home NodeB, the step of the macro NodeB acquiring the information of the target home NodeB is specifically:

the macro NodeB sending the home NodeB information request message to the target home NodeB;

the target home NodeB feeding back a home NodeB information request response message to the macro NodeB after receiving the home NodeB information request message; and besides a global identifier of a target NodeB and TAI information, information of the target NodeB in the home NodeB information request response message comprises one or more items in the following information: a cell type of a target NodeB cell, an EUTRAN Cell Global Identifier (ECGI), Closed Subscriber Group Identifier (CSG ID) information, an access attribute of the home NodeB and geographic location information of the home NodeB.

Furthermore, in the method for a macro NodeB acquiring information of a home NodeB, the home NodeB information request message and home NodeB information request response message are implemented by expanding an existing S1 interface message or X2 interface message, or are implemented through a newly added S1 interface message or X2 interface message;

if the home NodeB information request message and home NodeB information request response message are implemented through an S1 interface, the home NodeB information request message and home NodeB information request response message performs passthrough through a Mobility Management Entity (MME) or the MME and a home NodeB gateway.

The present invention also provides an apparatus for a macro NodeB acquiring information of a home NodeB, comprising:

a request module, used to: send a home NodeB information request message to a target home NodeB so as to acquire information of the target home NodeB;

a response module, used to: after receiving the home NodeB information request message, feed back a home NodeB information request response message to the request module; and besides a global identifier of a target NodeB and TAI information, information of the target NodeB in the home NodeB information request response message comprises one or more items in the following information: a cell type of a target NodeB cell, an ECGI, CSG ID information, an access attribute of the home NodeB and geographic location information of the home NodeB.

In the apparatus for a macro NodeB acquiring information of a home NodeB, the home NodeB information request message and home NodeB information request response message are implemented by expanding an existing S1 interface message or X2 interface message, or are implemented through a newly added S1 interface message or X2 interface message; when the home NodeB information request message and home NodeB information request response message are implemented through an S1 interface, the apparatus further comprises a passthrough module located at an MME and/or a home NodeB gateway, used to pass through the home NodeB information request message and home NodeB information request response message between the request module and response module.

In the present invention, information of the target NodeB is acquired actively through the macro NodeB, and according to the access type of the target NodeB, subscribers of the macro NodeB are timely balanced to the home NodeB which can provide services, thereby reducing a call drop rate resulted from blind handover. Since measurement information of the UE is fully considered, success rate of balancing handover is enhanced, and the object of performing effective load balancing in a home NodeB environment is achieved.

PREFERRED EMBODIMENTS OF THE PRESENT INVENTION

The basic idea of the present invention is: based on an S1 interface or X2 interface, a macro NodeB acquiring information of a target home NodeB through a home NodeB acquisition flow, and when load of a macro cell is excessive, the macro NodeB selecting an appropriate home NodeB for a UE to perform handover. In the present invention, information of a target NodeB is acquired actively through the macro NodeB, and according to an access type of the target NodeB, subscribers of the macro NodeB are timely balanced to the home NodeB which can provide services, thereby reducing a call drop rate resulted from blind handover. Since measurement information of the UE is fully considered, success rate of balancing handover is enhanced, and the object of performing effective load balancing in a home NodeB environment is achieved.

In order to make the object, technical scheme and advantages of the present invention more clear, the present invention will be further described in detail in combination with the given examples and accompanying drawings below.

Example 1

Figure 1:
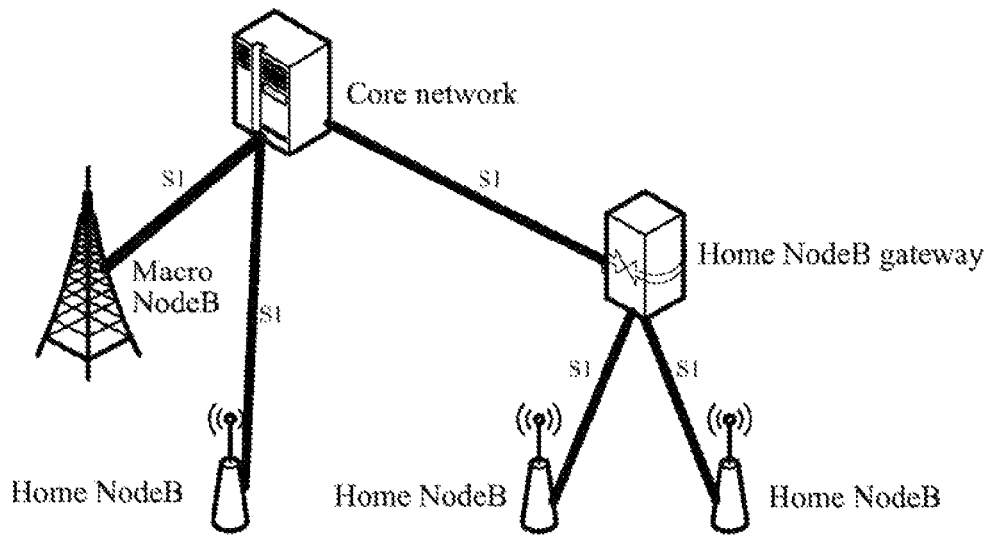
FIG. 1 is a schematic diagram of network structure of a home NodeB.
Figure 2:
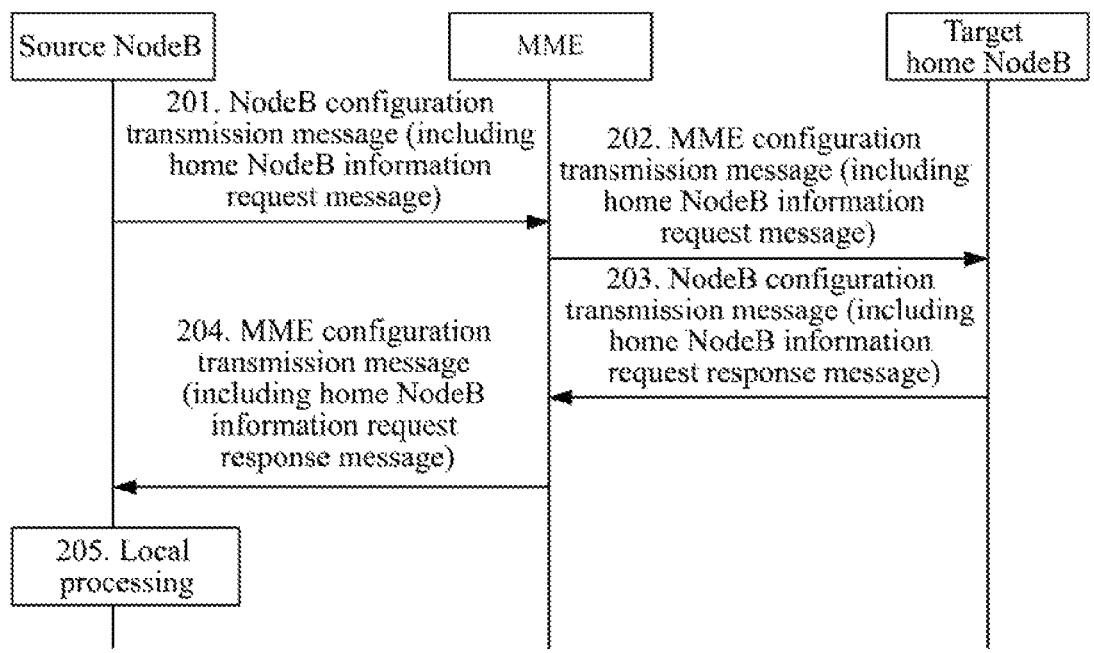
FIG. 2 is a flow for a macro NodeB acquiring information of a target home NodeB in the condition of the target home NodeB directly connected with a core network according to the present invention.

FIG. 2 is a flow for a macro NodeB acquiring information of a target home NodeB in the condition of the target home NodeB directly connected with a core network according to the present invention, and specific steps are as follows.

In step 201, a source NodeB (the macro NodeB) sends a home NodeB information request message to an MME.

The home NodeB information request message can be implemented by expanding an S1 interface NodeB configuration transmission message or implemented through a newly added S1 interface message, and the request message includes at least a message type, information of a target NodeB and information of the source NodeB.

The information of the target NodeB includes at least: a global identifier of the target NodeB and TAI information;

the information of the source NodeB includes at least: a global identifier of the source NodeB and Tracking Area Identifier (TAI) information.

In step 202, the MME passes through the home NodeB information request message to the target NodeB.

The MME can pass through the home NodeB information request message to the target NodeB through the expanded configuration transmission message or newly added S1 interface message.

In step 203, the target NodeB sends a home NodeB information request response message to the MME after receiving the home NodeB information request message passed through by the MME.

The home NodeB information request response message can be implemented through an expanded NodeB configuration transmission message or newly added S1 interface message.

Preferably, after receiving the home NodeB information request message, the target NodeB firstly judges whether the target NodeB itself is the macro NodeB, if it is the macro NodeB, the target NodeB directly replies with a home NodeB information request response including home NodeB information acquisition failure information, otherwise replies with the home NodeB information request response message including information of the target home NodeB.

The home NodeB information request response includes at least: the message type, information of the target NodeB and information of the source NodeB.

The information of the target NodeB includes at least: the global identifier of the target NodeB and TAI information. Preferably, the information of the target NodeB can further include one or more items as follows: a cell type of a target NodeB cell, an EUTRAN Cell Global Identifier (ECGI), an access attribute of the home NodeB and geographic location information of the home NodeB, and if the target NodeB is the home NodeB, Closed Subscriber Group Identifier (CSG ID) information can be further included;

the type of the target NodeB cell comprises: a macro cell and a home NodeB cell, or a type of cell coverage radius; the access attribute of the home NodeB comprises: an Open mode, a Close mode and a Hybrid mode; and the information of the source NodeB includes at least: the global identifier of the source NodeB and TAI information.

In step 204, the MME passes through the home NodeB information request response to the source NodeB through an expanded MME configuration transmission message or newly added S1 interface message.

In step 205, after receiving an information request response message of the target NodeB, the source NodeB performs local processing, such as updating information of a local neighboring cell or information of a neighboring NodeB.

Example 2

Figure 3:
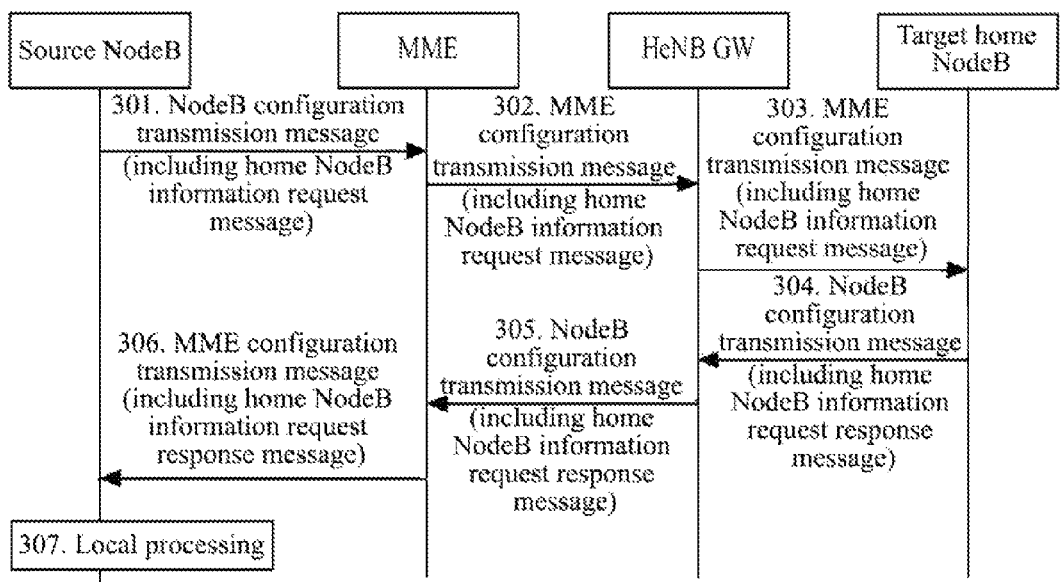
FIG. 3 is a flow for a macro NodeB acquiring information of a target home NodeB in the condition of the target home NodeB connected with a core network through a home NodeB gateway according to the present invention.

FIG. 3 is a flow for a macro NodeB acquiring information of a target home NodeB in the condition of the target home NodeB connected with a core network through a home NodeB gateway according to the present invention. The difference between this flow and the flow shown in FIG. 2 is that a home NodeB information request needs to be passed through to a target NodeB through the home NodeB gateway, a home NodeB information request response also needs to be passed through to an MME through the home NodeB gateway; during the passthrough, a used message can be an expanded MME configuration transmission message and an expanded NodeB configuration transmission message, or a newly added S1 interface message. The contents included in the home NodeB information request and home NodeB information request response are the same as that in the flow shown in FIG. 2, which will not be repeated here.

Example 3

If an X2 interface exists between a home NodeB and a macro NodeB, or the X2 interface exists between a home NodeB gateway and the macro NodeB, interaction of information of the home NodeB can be directly performed through the X2 interface between a source NodeB and a target NodeB, and a home NodeB information request and home NodeB information request response are not required to be passed through by a core network. Similarly, the home NodeB information request and home NodeB information request response can be transmitted through an expanded existing X2 interface message or a newly added X2 interface message, and the contents included in the request and response are the same as that in the flow shown in FIG. 2, which will not be repeated here.

Example 4

Figure 4:
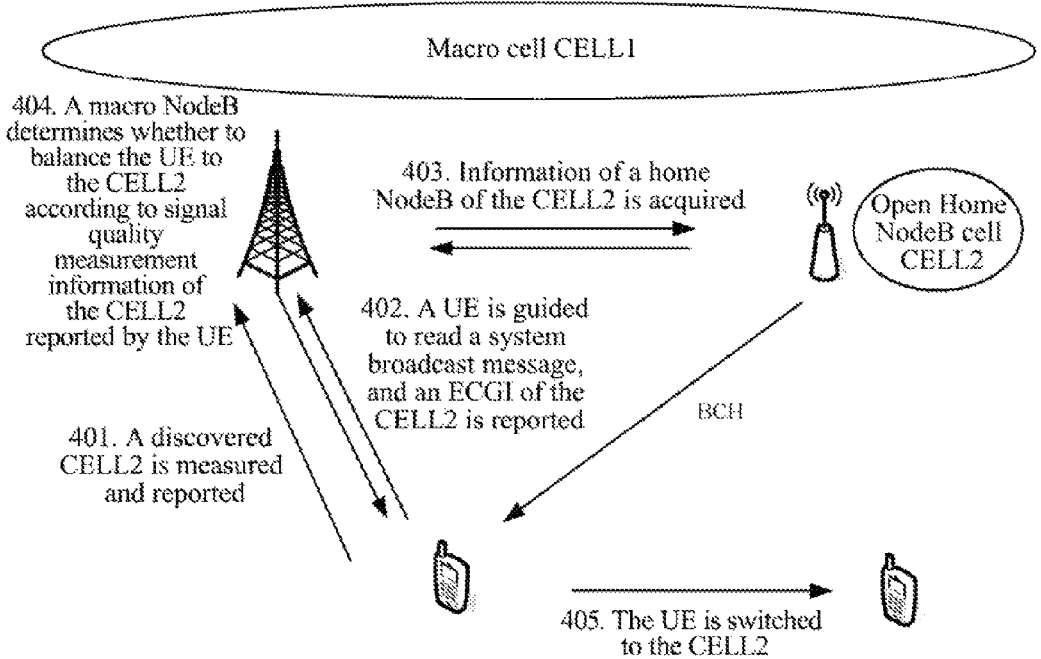
FIG. 4 is a flow for a macro cell balancing subscribers to a home NodeB in an Open mode in the home NodeB environment according to the present invention.

FIG. 4 is a flow for a macro cell balancing subscribers to a home NodeB in an Open mode in the home NodeB environment according to the present invention, and specific steps are as follows.

In step 401, a UE discovers a new cell in the macro cell, and reports a PCI of the newly discovered cell to a current serving macro NodeB through an automatic neighboring cell discovery flow, and since the macro NodeB can not judge whether the currently reported new cell is a home NodeB cell in the Open mode according to the PCI, further information is required to be acquired.

In the existing protocol, only the home NodeB cell in a Close mode and Hybrid mode can be distinguished through the PCI, therefore, in order to distinguish the home NodeB cell in the Open mode, further information is also required to be acquired. In one preferred example of the present invention, PCI can be expanded, a fixed allocation mode can be used to identify three access modes of the home NodeB, and thus the macro NodeB can directly judge the access mode of the currently reported new cell through the PCI.

In step 402, the macro NodeB guides the UE to read a system broadcast of the newly discovered cell, and acquires an ECGI of the newly discovered cell, since the home NodeB in the Open mode has no CSG ID information, a record of the neighboring cell identical with the macro cell is added in a Neighbor Relation Table (NRT).

In step 403, the macro NodeB can acquire information of the home NodeB of the newly discovered cell through the flow for acquiring the information of the home NodeB in the above example 1, 2 or 3, and save the record in local.

If information of a target NodeB in a home NodeB information request response includes a cell type of a target NodeB cell but does not include an access attribute, the macro NodeB judges whether the newly discovered cell is the home NodeB cell in the Open mode through the PCI and the cell type of the target NodeB cell.

If the information of the target NodeB in the home NodeB information request response includes the access attribute, the macro NodeB can directly judge whether the newly discovered cell is the home NodeB cell in the Open mode through the access attribute.

In step 404, when load of a macro NodeB cell exceeds a preset threshold, and the macro cell determines that load balancing needs to be performed, according to a measurement report reported by the UE, the macro NodeB selects the UE of which a signal quality measurement result of the home NodeB cell is relatively higher to perform handover.

With regard to the target home NodeB in the load balancing being a home NodeB in an intra-frequency Open mode, according to signal quality of the home NodeB cell in an intra-frequency measurement report reported by the UE in the macro cell, the macro NodeB selects the UE of which the signal quality measurement result of the home NodeB cell is relatively higher to perform handover.

With regard to the target home NodeB in the load balancing being a home NodeB in an inter-frequency Open mode, the macro cell sends an RRC reallocation message to the UE, deletes S-measure configuration information, makes the UE can perform inter-frequency measurement, and according to the signal quality of the home NodeB cell in the intra-frequency measurement report reported by the UE in the macro cell, selects the UE of which the signal quality measurement result of the home NodeB cell is relatively higher to perform handover.

In step 405, the UE is switched to the home NodeB cell in the Open mode through a normal handover flow.

Example 5

Figure 5:
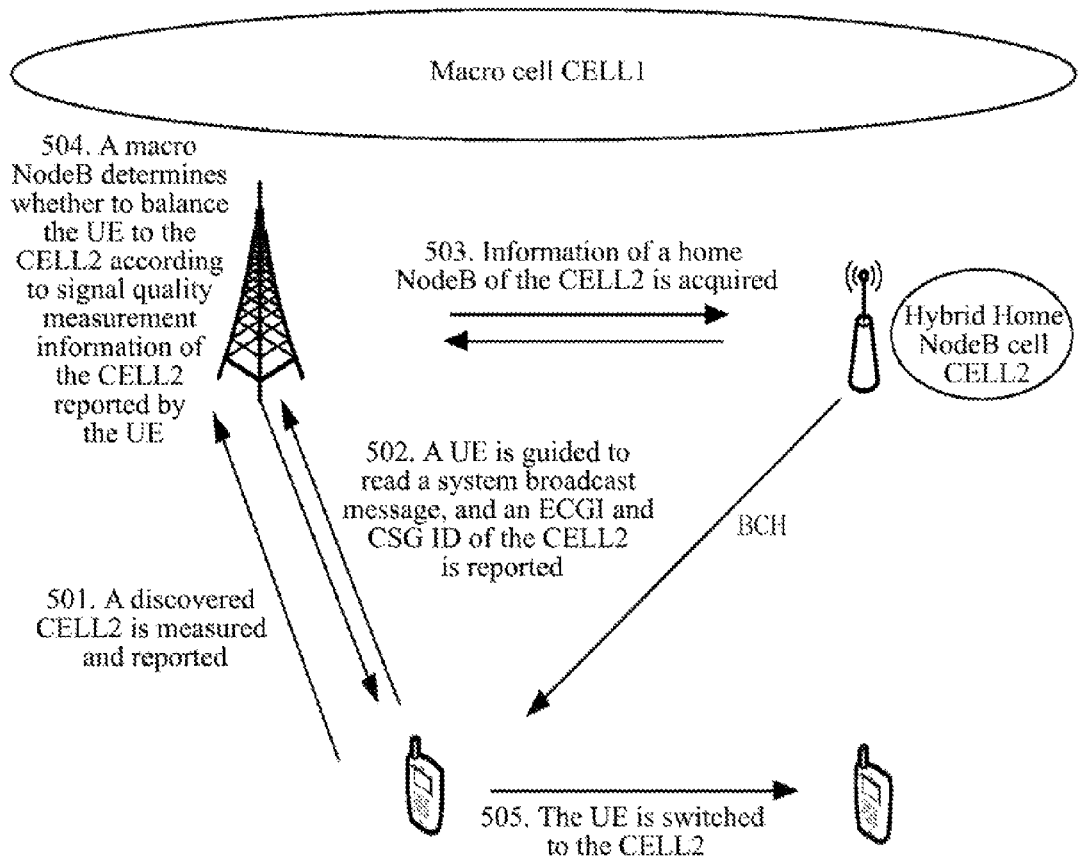
FIG. 5 is a flow for a macro cell balancing subscribers to a home NodeB in a Hybrid mode in the home NodeB environment according to the present invention.

FIG. 5 is a flow for a macro cell balancing subscribers to a home NodeB in a Hybrid mode in the home NodeB environment, and specific steps are as follows.

In step 501, a UE discovers a new cell in the macro cell, and reports a PCI of the newly discovered cell to a current serving macro NodeB through an automatic neighboring cell discovery flow, the macro NodeB can judge whether the currently reported new cell is a Hybrid home NodeB cell according to the PCI, and if it is the Hybrid home NodeB cell, further information is required to be acquired. In the present invention, an access mode of the home NodeB is precisely the access mode of all cells in the home NodeB.

In step 502, the macro NodeB guides the UE to read a system broadcast of the newly discovered cell, and acquires an ECGI and CSG ID information of the newly discovered cell, and reports the ECGI and CSG ID information to the macro NodeB at the same time, the macro NodeB adds a record of the neighboring cell in an NRT, and a network side also can save access mode information (Hybrid or Close) of the home NodeB.

In step 503, the macro NodeB can acquire information of the home NodeB of the newly discovered cell through the flow for acquiring the information of the home NodeB in the above example 1, 2 or 3, and save the record in local.

In step 504, when load of a macro NodeB cell exceeds a certain threshold, and the macro cell determines that load balancing needs to be performed, according to a measurement report reported by the UE, the macro NodeB selects the UE of which a signal quality measurement result of the home NodeB cell is relatively higher to perform handover.

With regard to a target home NodeB in the load balancing being a home NodeB in an intra-frequency Hybrid mode, according to signal quality of the home NodeB cell in an intra-frequency measurement report reported by the UE in the macro cell, the macro NodeB selects the UE of which the signal quality measurement result of the home NodeB cell is relatively higher to perform handover.

With regard to the target home NodeB in the load balancing being a home NodeB in an inter-frequency Hybrid mode, the macro cell sends a Radio Resource Control (RRC) reallocation message to the UE, deletes S-measure configuration information, makes the UE can perform inter-frequency measurement, and according to the signal quality of the home NodeB cell in the intra-frequency measurement report reported by the UE in the macro cell, selects the UE of which the signal quality measurement result of the home NodeB cell is relatively higher to perform handover. The S-measure is a measurement threshold and used to trigger the inter-frequency measurement, and when signal quality of a serving cell is lower than the threshold, the inter-frequency measurement is triggered.

In step 505, the UE is switched to the home NodeB cell in the Hybrid mode through a home NodeB handover flow.

Figure 6:
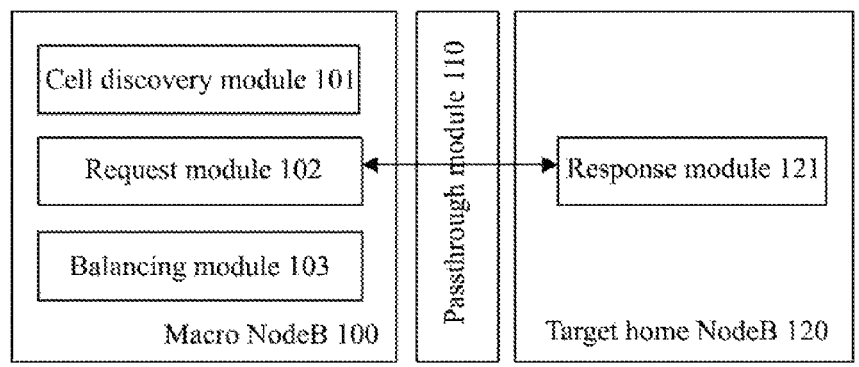
FIG. 6 is a structure diagram of an apparatus for implementing load balancing in the home NodeB environment according to the present invention.

FIG. 6 is a structure diagram of an apparatus for implementing load balancing in the home NodeB environment provided by the present invention. The apparatus includes: a cell discovery module 101, a request module 102, a balancing module 103 and a response module 121.

The cell discovery module 101 is used to: before acquiring information of a target home NodeB, receive a Physical Cell Identifier (PCI) of a newly discovered cell reported by a UE, guide the UE to read a system broadcast of the newly discovered cell, and acquire an ECGI or the ECGI and CSG ID information of the newly discovered cell;

the request module 102, located at a macro cell, is used to: according to the information such as the ECGI and so on obtained by the cell discovery module 101, send a home NodeB information request message to the target home NodeB so as to obtain the information of the target home NodeB;

the response module 121, located at the target home NodeB, is used to: after receiving the home NodeB information request message, feed back a home NodeB information request response message to the request module;

besides a global identifier of a target NodeB and TAI information, information of the target NodeB in the home NodeB information request response message contains one or more items in the following information: a cell type of a target NodeB cell, an EUTRAN Cell Global Identifier (ECGI), Closed Subscriber Group Identifier (CSG ID) information, an access attribute of the home NodeB and geographic location information of the home NodeB; and the type of the target NodeB cell comprises: a macro cell and a home NodeB cell, or a type of cell coverage radius; the access attribute of the home NodeB comprises: an Open mode, a Close mode and a Hybrid mode.

Preferably, the home NodeB information request message and home NodeB information request response message are implemented by expanding an existing S1 interface message or X2 interface message, or are implemented through a newly added S1 interface message or X2 interface message; when the home NodeB information request message and home NodeB information request response message are implemented through an S1 interface, the apparatus further comprises a passthrough module 110 located at an MME and/or a home NodeB gateway, and the module is used to pass through the home NodeB information request message and home NodeB information request response message between the request module and response module.

The balancing module 103 is used to: when load of the macro cell exceeds a preset threshold, according to the information of the target home NodeB obtained by the request module 102 and a measurement report reported by the UE, select the target home NodeB with relatively better signal quality for the UE to perform handover.

Preferably, according to the PCI obtained by the cell discovery module 101 or the information of the target home NodeB acquired by the request module 102, the balancing module 103 judges an access attribute of the newly discovered cell, and when the access attribute of the newly discovered cell is the Open mode or Hybrid mode, executes a handover operation for the purpose of load balancing.

With regard to the target home NodeB in the load balancing being a home NodeB in an inter-frequency Open mode or inter-frequency Hybrid mode, the balancing module 103 sends an RRC reallocation message to the UE, deletes S-measure configuration information, makes the UE can perform inter-frequency measurement, and according to signal quality of the home NodeB cell in an intra-frequency measurement report reported by the UE in the macro cell, selects the UE of which a signal quality measurement result of the home NodeB cell is relatively higher to perform handover.

The above description is only the preferred examples of the present invention, which is not used to limit the protection scope of the present invention.

What is claimed is:

1. A method for implementing load balancing in a home NodeB environment, comprising:

a macro NodeB actively sending a home NodeB information request message to target home NodeBs so as to acquire information of the target home NodeBs in following way:

the macro NodeB sending the home NodeB information request message to the target home NodeBs;

the target home NodeBs feeding back a home NodeB information request response message to the macro NodeB after receiving the home NodeB information request message;

wherein, the home NodeB information request message and home NodeB information request response message are implemented through a newly added X2 interface message or a newly added S1 interface message;

if the home NodeB information request message and home NodeB information request response message are implemented through a S1 interface, the home NodeB information request message and home NodeB information request response message performs passthrough through a Mobility Management Entity (MME) and a home NodeB gateway;

when the load of a macro cell exceeds a preset threshold, according to the obtained information of the target home NodeBs and a measurement report reported by a User Equipment (UE), the macro NodeB selecting the target home NodeB with better signal quality for the UE to perform handover.

2. The method according to claim 1, wherein, besides a global identifier of a target NodeB and Tracking Area Identifier (TAI) information, information of the target NodeB in the home NodeB information request response message comprises one or more items in the following information: a cell type of a target NodeB cell, an EUTRAN Cell Global Identifier (ECGI), Closed Subscriber Group Identifier (CSG ID) information, an access attribute of the home NodeB and geographic location information of the home NodeB; and the type of the target NodeB cell comprises: the macro cell and a home NodeB cell, or a type of cell coverage radius; the access attribute of the home NodeB comprises: an Open mode, a Close mode and a Hybrid mode.

3. The method according to claim 1, before the macro NodeB acquires the information of the target home NodeB, further comprising:

the UE discovering a new home NodeB cell in the macro cell, and reporting a Physical Cell Identifier (PCI) of the newly discovered home NodeB cell to a current serving macro NodeB through an automatic neighboring cell discovery flow;

the macro NodeB guiding the UE to read a system broadcast of the newly discovered home NodeB cell, and acquiring the EUTRAN Cell Global Identifier (ECGI) or the ECGI and Closed Subscriber Group Identifier (CSG ID) information of the newly discovered home NodeB cell.

4. The method according to claim 1, after the macro NodeB acquires home NodeB information of the newly discovered home NodeB cell, further comprising:

the macro NodeB judging access attribute of the newly discovered home NodeB cell through the Physical Cell Identifier (PCI), or judging the access attribute of the newly discovered home NodeB cell through the access attribute of the home NodeB carried in the home NodeB information request response message;

the macro NodeB executing a handover operation for the purpose of load balancing to the target home NodeB of which the access attribute is an Open mode or Hybrid mode.

5. The method according to claim 4, wherein, with regard to the target home NodeB in the load balancing being the home NodeB in an inter-frequency Open mode or inter-frequency Hybrid mode, the macro NodeB sends a Radio Resource Control (RRC) reallocation message to the UE, deletes S-measure configuration information, makes the UE to be able to perform inter-frequency measurement, and according to the signal quality of the home NodeB cell in an intra-frequency measurement report reported by the UE in the macro cell, selects the UE of which a signal quality measurement result of the home NodeB cell is higher to perform handover.

6. An apparatus for implementing load balancing in a home NodeB environment comprising:

a request module in a macro Node B actively send a home NodeB information request message to a target home NodeBs so as to acquire information of the target home NodeBs;

a response module in target home NodeBs after receiving the home NodeB information request message, feed back a home NodeB information request response message to the request module; and a balancing module in a macro Node B, when the load of a macro cell exceeds a preset threshold, according to the obtained information of the target home NodeBs and a measurement report reported by a UE, select the target home NodeB with better signal quality for the UE to perform handover;

wherein, the home NodeB information request message and the home NodeB information request response message are implemented through a newly added S1 interface message or a newly added X2 interface message;

wherein if the home NodeB information request message and home NodeB information request response message are implemented through an S1 interface, the apparatus further comprises a passthrough module located at an Mobility Management Entity (MME) and a home NodeB gateway, used to pass through the home NodeB information request message and home NodeB information request response message between the request module and response module.

7. The apparatus according to claim 6, wherein, besides a global identifier of a target NodeB and Tracking Area Identifier (TAI) information, information of the target NodeB in the home NodeB information request response message comprises one or more items in the following information: a cell type of a target NodeB cell, an EUTRAN Cell Global Identifier (ECGI), Closed Subscriber Group Identifier (CSG ID) information, an access attribute of the home NodeB and geographic location information of the home NodeB;

the type of the target NodeB cell comprises: the macro cell and a home NodeB cell, or a type of cell coverage radius; the access attribute of the home NodeB comprises: an Open mode, a Close mode and a Hybrid mode.

8. The apparatus according to claim 6, further comprising:

a cell discovery module, used to: before acquiring the information of the target home NodeB, receive a PCI of a newly discovered cell reported by the UE, guide the UE to read a system broadcast of the newly discovered cell, and acquire an ECGI or the ECGI and CSG ID information of the newly discovered cell;

the balancing module judges an access attribute of the newly discovered cell according to the Physical Cell Identifier (PCI) or the information of the target home NodeB acquired by a home NodeB information acquisition module, and when the access attribute of the newly discovered cell is an Open mode or Hybrid mode, executes a handover operation for the purpose of load balancing.

9. The apparatus according to claim 8, wherein, with regard to the target home NodeB in the load balancing being a home NodeB in an inter-frequency Open mode or inter-frequency Hybrid mode, the balancing module sends an RRC reallocation message to the UE, deletes S-measure configuration information, makes the UE can perform inter-frequency measurement, and according to the signal quality of the home NodeB cell in an intra-frequency measurement report reported by the UE in the macro cell, selects the UE of which a signal quality measurement result of the home NodeB cell is higher to perform handover.

10. A method for a macro NodeB acquiring information of a home NodeB, comprising:
   the macro NodeB actively sending a home NodeB information request message to target home NodeBs so as to acquire information of the target home NodeBs in the following way:
   the macro NodeB sending the home NodeB information request message to the target home NodeB;
   the target home NodeB feeding back a home NodeB information request response message to the macro NodeB after receiving the home NodeB information request message;
   wherein, the home NodeB information request message and home NodeB information request response message are implemented through a newly added S1 interface message or a newly added X2 interface message;
   if the home NodeB information request message and home NodeB information request response message are implemented through an S1 interface, the home NodeB information request message and home NodeB information request response message performs passthrough through a Mobility Management Entity (MME) and a home NodeB gateway.

11. The method according to claim 10, wherein, besides a global identifier of a target NodeB and Tracking Area Identifier (TAI) information, information of the target NodeB in the home NodeB information request response message comprises one or more items in the following information: a cell type of a target NodeB cell, an EUTRAN Cell Global Identifier (ECGI), Closed Subscriber Group Identifier (CSG ID) information, an access attribute of the home NodeB and geographic location information of the home NodeB.

12. An apparatus for a macro NodeB acquiring information of a home NodeB, comprising:
   a request module in a macro Node B actively send a home NodeB information request message to target home NodeBs so as to acquire information of the target home NodeBs;
   a response module in target home NodeBs, after receiving the home NodeB information request message, feed back a home NodeB information request response message to the request module;
   wherein, besides a global identifier of a target NodeB and Tracking Area Identifier (TAI) information, information of the target NodeB in the home NodeB information request response message comprises one or more items in the following information: a cell type of a target NodeB cell, an EUTRAN Cell Global Identifier (ECGI), Closed Subscriber Group Identifier (CSG ID) information, an access attribute of the home NodeB and geographic location information of the home NodeB;
   wherein, the home NodeB information request message and home NodeB information request response message are implemented through a newly added S1 interface message or a newly added X2 interface message;
   wherein, if the home NodeB information request message and home NodeB information request response message are implemented through an S1 interface, the apparatus further comprises a passthrough module located at an Mobility Management Entity (MME) and a home NodeB gateway, used to pass through the home NodeB information request message and home NodeB information request response message between the request module and response module.

* * * * *